United States Patent
Motooka

(10) Patent No.: US 6,330,314 B1
(45) Date of Patent: Dec. 11, 2001

(54) ANSWERING MACHINE/PHONE FOR CONTROLLING A DISPLAY BASED UPON CALLER ID INFORMATION RECEIVED FROM CALLERS

(75) Inventor: Keiji Motooka, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/086,584

(22) Filed: May 29, 1998

(30) Foreign Application Priority Data

Jun. 19, 1997 (JP) ................................................ 9-162268

(51) Int. Cl.[7] .................................................... H04M 1/56
(52) U.S. Cl. .................................. 379/142.06; 379/88.21; 379/67.1; 379/88.22; 379/142.01
(58) Field of Search .............................. 379/88.22, 88.23, 379/88.24, 88.25, 88.26, 88.27, 88.28, 142, 88.12, 88.11, 81, 67.1, 70, 88.19, 88.2, 88.21, 142.06, 142.01, 142.04, 142.17

(56) References Cited

U.S. PATENT DOCUMENTS

| | | | |
|---|---|---|---|
| 5,390,236 | * | 2/1995 | Klausner et al. .................. 379/88.11 |
| 5,400,393 | * | 3/1995 | Knuth et al. ...................... 379/88.27 |
| 5,748,709 | * | 5/1998 | Sheerin .............................. 379/88.22 |
| 5,768,349 | * | 6/1998 | Knuth et al. ...................... 379/88.22 |
| 5,825,852 | * | 10/1998 | DePond et al. ................... 379/88.12 |
| 6,058,178 | * | 5/2000 | McKendry et al. ................ 379/212 |

FOREIGN PATENT DOCUMENTS

| | | |
|---|---|---|
| 1-278150 A | 11/1989 | (JP) . |
| 2-56154 A | 2/1990 | (JP) . |
| 5-176047 A | 7/1993 | (JP) . |

* cited by examiner

Primary Examiner—Fan Tsang
Assistant Examiner—Ovidio Escalante
(74) Attorney, Agent, or Firm—Nixon & Vanderhye P.C.

(57) ABSTRACT

When a business message, sent from a caller's phone, is recorded in the recording/playback section, the main control section makes a judgement as to whether or not any phone number that coincides with the caller's phone number contained in caller's information received by the caller information receiving section has been recorded in a storage section. If the judgment shows that there is a coincided phone number, it provides a special display in which, for example, the back light or LED of the display section is allowed to flicker, for example, at intervals of 4 Hz, or the illumination color of the back light or the LED is changed, or a message, such as "a business message from Mr. O O", is displayed. Thus, the answer phone makes it possible for the user to positively recognize whether or not a business message from a desired caller has been recorded promptly.

13 Claims, 3 Drawing Sheets

ANSWERING MACHINE/PHONE FOR CONTROLLING A DISPLAY BASED UPON CALLER ID INFORMATION RECEIVED FROM CALLERS

FIELD OF THE INVENTION

The present invention relates to an answer phone.

BACKGROUND OF THE INVENTION

Conventionally, there are answer phones which, upon receipt of an incoming call, automatically catch the communication line, send a response message that has been registered beforehand to the corresponding communication line and, upon completion of the sending of the response message, record an arrival business message from the communication line. In such answer phones, after having recorded the business message, the user is allowed to easily recognize that the business message has been recorded by an LED (Light Emitting Diode) or back light turning on and off or by information such as the number of recorded messages displayed on the screen such as a LCD.

Moreover, in recent years, answer phones, which is adopted to the caller ID service in which, upon receipt of an incoming call, a phone number on the caller side is informed, have been proposed. In such caller ID service correspondence-type answer phones, those answer phones have been proposed in which phone numbers on the caller side are memorized in association with the recorded business messages, and during playback of the business messages, the phone numbers that have been memorized in association with the business messages are displayed on the screen such as a LCD.

In the above-mentioned conventional apparatuses, however, although the user can easily recognize whether or not business messages have been recorded, the user is not allowed to recognize whether or not a business message from a desired caller has been recorded until he or she actually play back the recorded business messages; this takes a lot of time for the user to recognize. Moreover, in the answer phone on the caller ID correspondence side, although it is possible to recognize whether or not a business message from a desired caller has been recorded by successively displaying the phone numbers that have been memorized in association with the business messages on the screen through a predetermined operation, the user requires complicated operations, failing to make a prompt recognition.

SUMMARY OF THE INVENTION

The objective of the present invention is to provide an answer phone which allows the user to positively recognize whether or not a business message from a desired caller has been recorded promptly without the need for complicated operations.

In order to achieve the above objective, the answer phone of the present invention, which, upon receipt of an incoming call, automatically catches the communication line, records a business message sent from the caller, and upon completion of the recording of the business message, allows a display section to provide a display indicating that the business message has been recorded, is provided with: a receiving section for receiving information from the caller sent through the communication line upon receipt of an incoming call, a memory section for preliminarily storing phone numbers of specific callers, a comparison section for comparing the phone numbers from the caller included in the information from the callers that has been received by the receiving section with the phone numbers that have been preliminarily stored in the memory section, and a control section for carrying out a display control on the display section based upon the results of comparison.

In the above-mentioned answer phone, when, upon receipt of an incoming call, information from the caller sent through the communication line is received by the receiving section, the comparison section compares the phone numbers from the callers included in the information from the caller that has been received by the receiving section with the phone numbers that have been preliminarily stored in the memory section, and based on the results of the comparison, the control section controls the display section.

In other words, the answer phone of the present invention allows the user to promptly recognize whether or not a business message from a desired caller has been recorded easily by differentiating the state of display indicating that any business message has been recorded, depending on the cases in which the phone number from the caller coincides with any of the phone numbers that have been preliminarily stored and in which it does not coincide with any of those numbers.

For a fuller understanding of the nature and advantages of the invention, reference should be made to the ensuing detailed description taken in conjunction with the accompanying drawings.

DESCRIPTION OF THE EMBODIMENTS

Referring to Figures, the following description will discuss one embodiment of the present invention. The answer phone of the present invention is an answer phone that is adapted to the caller ID service, and when phone numbers of specific callers (hereinafter, referred to as specific numbers) have been preliminarily registered, the answer phone makes it possible to discriminate an incoming call from any of the callers of the specific numbers from other incoming calls.

Figure 1:
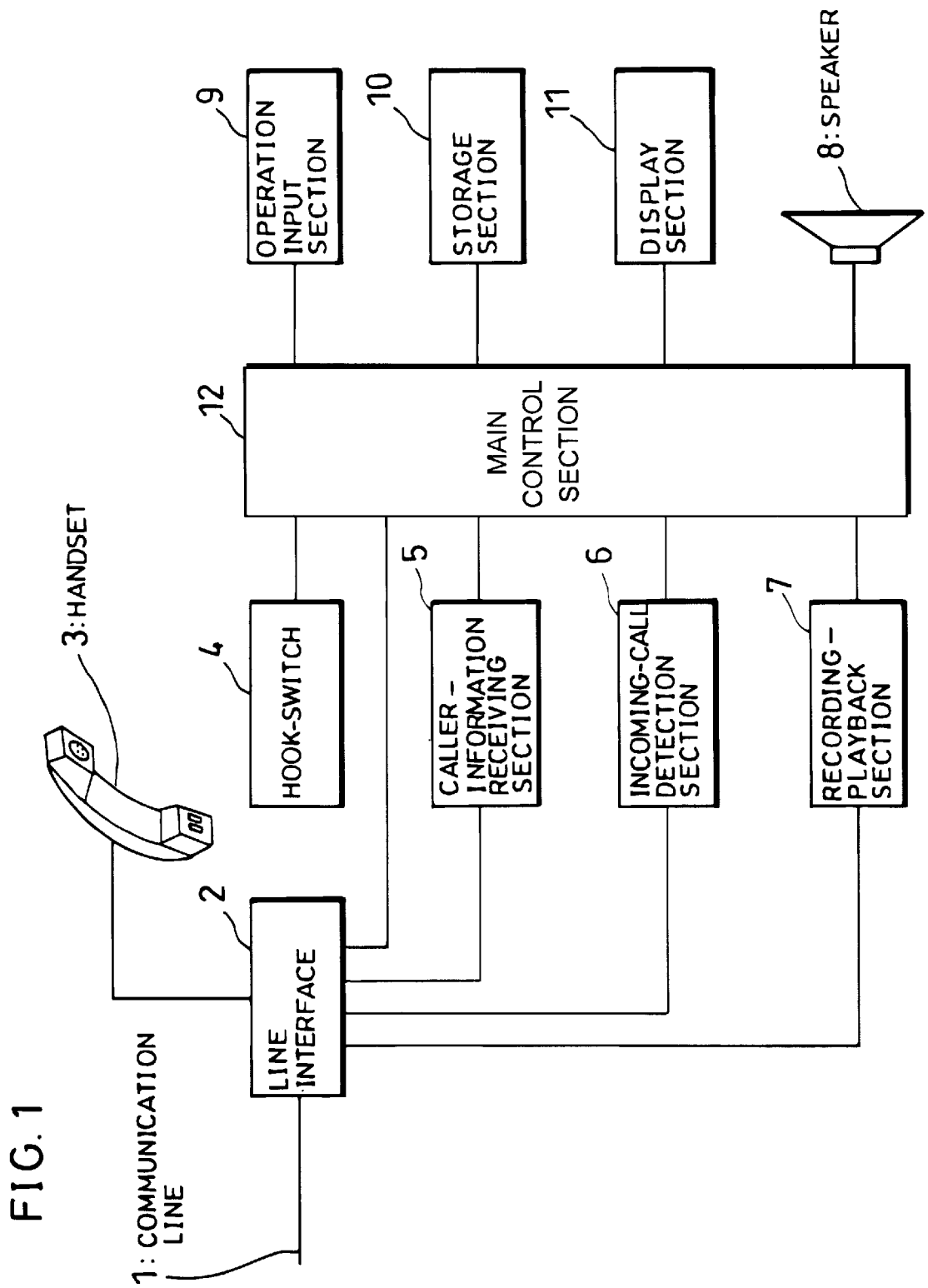
FIG. 1, which shows one embodiment of the present invention, is a schematic functional block diagram that indicates an electrical construction of an answer phone.

In FIG. 1, reference number 1 indicates a communication line that is connected to the phone on the caller side through a switchboard, not shown. Reference number 2 is a line interface which captures and opens the communication line 1, and forms a communication channel with the switchboard or the phone on the caller side through the captured communication line 1. Reference number 3 is a handset by which communication is carried out with the phone on the other party through the channel formed by the line interface 2, and reference number 4 is a hook switch for detecting the holding or hanging-up of the handset 3.

Reference numeral 5 is a caller-information receiving section (receiving means) for receiving caller information (caller ID information) that comes in through the communication line 1, reference number 6 is an incoming-call detection section for detecting a calling signal arrived through the communication line 1, reference number 7 is a recording-playback section for recording and playing back response messages and business messages, and reference number 8 is a speaker for externally releasing audible ringing signals given based upon detection of the incoming-call detection section 6 and response messages and business messages that are played back by the recording-playback section 7. With respect to the recording-playback section 7, a DSP (Digital Signal Processor) and a RAM (Random Access Memory) installed in the present answer phone may be adopted, or an MD (Mini Disc) and a cassette tape, which are removably inserted into the present answer phone, may be adopted.

Reference number 9 is an operation input section consisting of number keys by which an input of phone numbers, etc. is made and function keys by which the answering modes are alternated or released and demands for playing back business messages, etc. are given, reference number 10 is a storage section (a storage means, a recording-position storage means) for storing phone number information, such as specific numbers inputted through the operation input section 9 and caller phone numbers included in caller information that has been received by the caller-information receiving section 5, and various kinds of information such as address information, etc. regarding recorded messages in the recording-playback section 7, and reference number 11 is a display section (a display means) for displaying various states including a recording state of business messages and a state of answering mode.

Reference number 12, which is a main control section serving as a comparison means and Et control means, carries out line capture/open control in the line interface 2, recording/playback control in the recording-playback section 7, sound-releasing control in the speaker 8, write/read control in the storage section 10, display control in the display section 11, etc., based upon detection signals from the hook-switch 4, caller's information from the information receiving section 5, detection signals from the incoming-call detection section 6, instruction signals from the operation input section 9, phone number information stored in the storage section 10, etc.

In the answer phone arranged as described above, the registration of specific numbers is preliminarily carried out in order to distinguish an incoming call related to any of the specific numbers from incoming calls related to other phone numbers in the answering mode. The following description will discuss an example of the registering operation.

For example, a number registration key is placed on the operation input section 9, and when the user operates the number registration key, the present answer phone is allowed to enter a stand-by state for registration of specific numbers. Here, when a phone number is inputted through the number keys, the phone number is stored in the memory section 10 as a specific number through the main control section 12. Upon completion of the input of the specific number, the present answer phone is allowed to return to the normal stand-by state by operating, for example, a completion key placed on the operation input section 9. Here, the number of specific numbers stored in the memory section 10 is not specifically limited, and in the present embodiment, it is supposed that a plurality of numbers can be registered.

Figure 2:
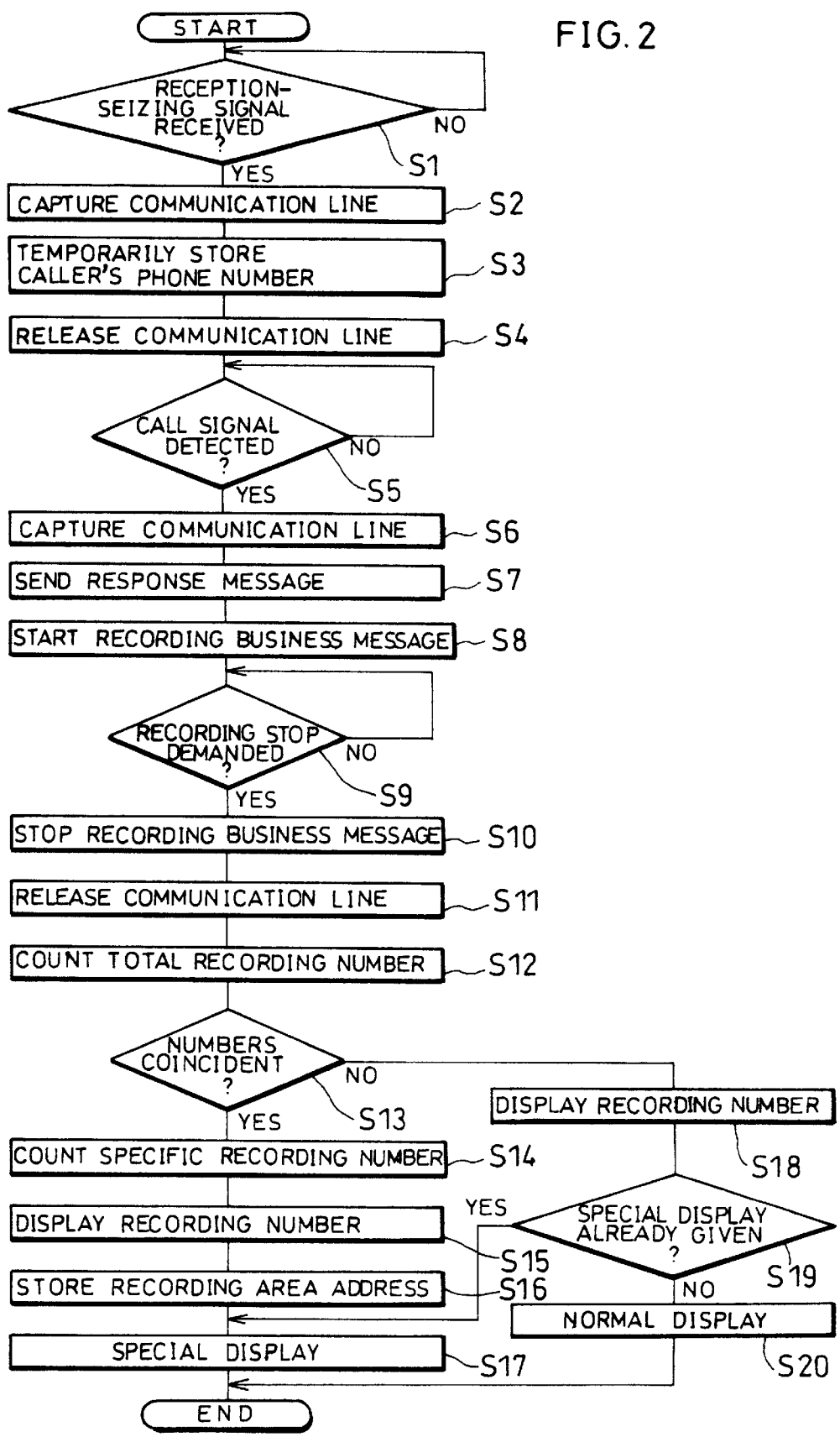
FIG. 2 is a flow chart that shows an operation control during the answering mode in the answer phone.

With respect to the answer phone having specific numbers registered as described above, an explanation will be given of the operation in the answering mode, by reference to a flow chart in FIG. 2.

In the present answer phone, first, an instruction for transition to the answering mode is given by the user through the operation input section 9 so that the main control section 12 has been shifted to the answering mode. In this state, when an incoming call from another phone is received by the present answer phone, the switchboard, located between the present answer phone and the other phone, first transmits a reception-seizing signal to the present answer phone through the communication line 1. Here, the reception-seizing signal refers to a signal for activating the slave terminal (in this case, the answer phone) and for allowing the slave terminal to receive the incoming caller information from the switchboard.

When the reception-seizing signal sent from the communication line 1 has been received by the caller-information receiving section 5 (S1), the main control section 12 controls the communication interface 2 based upon the detection signal from the caller-information receiving section 5 so as to capture the communication line 1 (S2). In this case, upon receipt of a primary response signal direct current loop from the answer phone, the switchboard sends caller information (MODEM signals), etc.

In the present answer phone, after the communication line 1 has been captured, the caller's phone number, contained in the caller information received by the caller-information receiving section 5, is stored in a temporary storage area in the storage section 10 (S3). Thereafter, the line interface 2 is again controlled so as to release the communication line 1 (S4). After receiving a reception-finishing signal (that is, cutoff of the direct current loop due to opening of the communication line 1) from the answer phone, the switchboard sends a call signal to the answer phone.

Thus, the call signal is arrived at the present answer phone from the communication line 1 within a predetermined time, and when the call signals arriving from the communication line 1 have been detected by the incoming-call detection section 6 not less than predetermined times (S5), the main control section 12 controls the line interface 2, thereby capturing the communication line 1 (S6). Upon capture of the communication line 1, a communication path is formed between the present answer phone and the caller's phone.

Simultaneously as the formation of the communication path, the main control section 12 controls the recording-playback section 7 so that the response message which has been preliminarily registered is played back, and sent to the caller's phone through the channel made by the line interface 2 (S7). Thereafter, upon completion of the playback of the response message, the main control section 12 controls the recording-playback section 7 so as to record a business message given from the caller's phone through the channel formed by the line interface 2 (S8). In this case, if a ring-off signal that might arrive through the communication line 1 is detected, or if a demand for stopping the recording of the business message is given for reasons such as a lapse of a predetermined time (S9), the main control section 12 controls the recording-playback section 7 so as to stop the recording of the business message (S10), as well as releasing the communication line 1 by controlling the line interface 2 (S11).

Additionally, if the ring-off signal is detected through the communication line 1 prior to the start of the recording of the business message, the main control section 12 controls the line interface 2 so as to release the communication line 1, thereby completing the answering operation and returning to the stand-by state.

When the communication line 1 is released at S11, the main control section 12 starts counting the number of total recordings by using a built-in total-recording-number counter (not shown)(S12), as well as making a judgement as to whether or not the caller's phone number stored in the temporary storage area in the storage section 10 coincides with any of the specific phone numbers stored in another area in the storage section 10 (S13).

If the judgment shows that there is a specific number coinciding with the caller's phone number, the main control section 12 allows a built-in specific-recording-number counter (not shown) to count the number of total recordings (S14), and controls the display section 11 so as to display the number of specific recordings and the number of specific recordings (S15). Simultaneously, a special display is given, in which the back light or the LED of the display section 11 is made to flicker, for example, at intervals of 4 Hz, or the illumination color of the back light or the LED is changed from red to green, or a message, such as "a business message from Mr. O O", is displayed (S16). Then, the addresses regarding the areas in which the business messages are recorded in the storage section 10 (S17), and thereafter, the answering operation is completed and the sequence returns to the stand-by state. In this case, if a message regarding another specific number has already been displayed at S16, a message regarding the specific number corresponding to the incoming call is displayed in addition to the message already displayed.

In contrast, if the judgment shows that there is no specific phone number coinciding with the caller's phone number, the main control section 12 controls the display section 11 so as to display the number of total recordings and the number of specific recordings (S18), as well as making a judgment as to whether or not any special display has already been given (S19). If the judgment shows that any special display has already been given, the main control section 12 continues to give the special display (S16), and if the judgment shows that no special display has been given, the main control section 12 provides the normal display indicating that there are recorded business messages by flickering the back light or the LED of the display section 11 at intervals of 1 Hz or giving a red illumination to the back light or the LED (S20). Thereafter, the answering operation is completed and the sequence returns to the stand-by state.

Therefore, in the above-mentioned controlling operation, the user can easily recognize the fact that there are recorded business messages and also easily recognize whether or not the business messages include any messages from desired callers.

Figure 3:
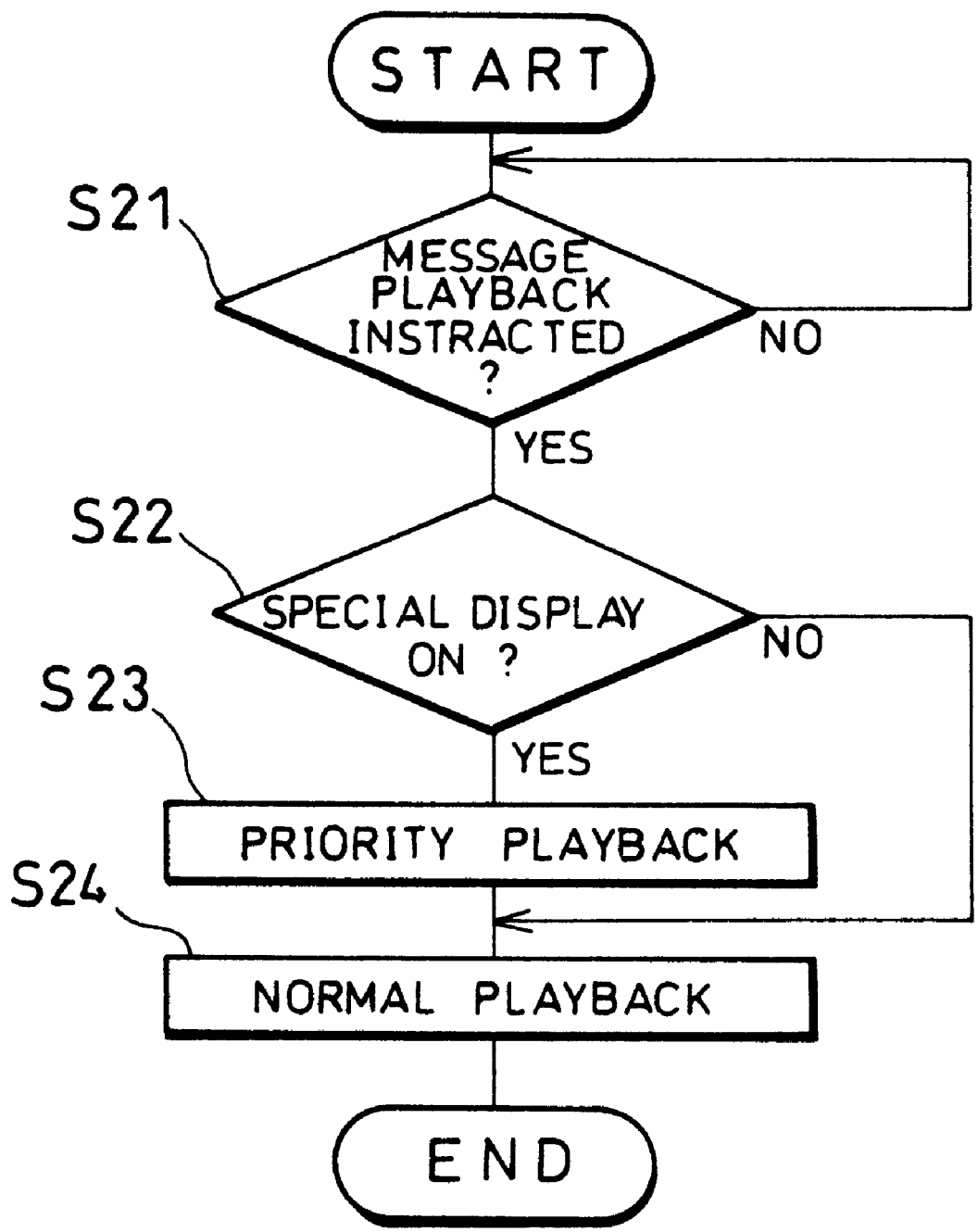
FIG. 3 is a flow chart that shows an operation control during playback on messages in the answer phone.

Next, referring to a flow chart in FIG. 3, an explanation will be given of an operation for playing back business messages that have been recorded in accordance with the above-mentioned controlling operation.

When the user instructs a playback of business message by operating the operation input section 9 (S21), the main control section 12 makes a judgement as to whether or not any special display has been given on the display section 11 (S22). If the judgment shows that any special display has been given, the main control section 12 controls the recording-playback section 7 so as to successively reproduce business messages from callers desired by the user based on the addresses stored in the storage section 10 (S23). Further, after completion of the priority playback, the rest of the business messages are reproduced in the order in which they were recorded (S24). Moreover, if the judgment shows that no special display has been given, the main control section 12 reproduces the business messages in the order in which they were recorded in the recording-playback section 7 (S24).

Therefore, with the above-mentioned controlling operation, it is possible to preferentially reproduce business messages from desired callers contained in the recorded business messages without requiring any complicated operations for the user.

Additionally, when, at S23, a priority playback is carried out based on addresses, a DSP, a RAM, an MD, etc., which records messages in the recording-playback section 7 in the digital data format, is used. Here, even when a cassette tape, etc., which records messages in the recording-playback section 7 in the analog data format, is used, the priority playback is carried out by using two tapes and allowing the main control section 12 to alternatively use the recording tapes during the recording process of a message.

Moreover, the counted values in the total-recording-number counter and in the specific-recording-number counter are initialized after the above-mentioned playback of business messages. The above-mentioned initialization of the counters may be, for example, carried out as follows: a clear key is placed at the operation input section 9 and the user operates the clear key so as to carry out the initialization, or the initialization may be automatically carried out after playback of business messages. Further, in the case when a DSP or a RAM installed in the present answer phone is used for the recording-playback section 7, simultaneously with the initialization of the counters, business messages, stored in the recording-playback section 7, may be erased at the same time. Furthermore, in the case when an MD or a cassette tape is used for the recording-playback section 7, the initialization of the counters may be carried out simultaneously as the MD or the tape is drawn.

As described above, the answer phone of the present invention is provided with the receiving section 5 for receiving information from the caller sent through the communication line 1 upon receipt of an incoming call and the main control section 12 for comparing the callers' phone numbers included in the callers' information that has been received by the receiving section 5 with specific phone numbers that have been preliminarily stored, and for carrying out a display control on the display section 11 based upon the results of comparison.

With this arrangement, when, upon receipt of an incoming call, the caller's information is received from the communication line 1 by the receiving section 5, the main control section 12 compares the caller's phone number contained in the caller's information with the specific numbers preliminarily stored. Based upon the results of comparison, the main control section 12 controls the display section 11 so that the state of display indicating that any business message has been recorded can be differentiated depending on the cases in which the phone number from the caller coincides with any of the phone numbers that have been preliminarily stored and in which it does not coincide with any of those numbers. Thus, the user is allowed to easily recognize whether or not any business message from a desired caller has been recorded promptly.

Moreover, in the above answer phone, when the judgement shows that the caller's phone number coincides with any of the specific numbers, the main control section 12 allows the display section 11 to give a special display, and the special display is continuously maintained independent of the results of comparison between callers' information arriving thereafter and the specific numbers.

Consequently, when, upon receipt of an incoming call, the caller's information is received from the communication line 1 by the receiving section 5, the main control section 12 compares the caller's phone number contained in the caller's information with the specific numbers. As a result, when the judgement shows that the caller's phone number coincides with any of the specific numbers, the main control section 12 allows the display section 11 to give a special display. From this time on, the special display is continuously maintained independent of the results of comparison made by the main control section 12 so that the user is allowed to easily recognize whether or not any business message from a desired caller has been recorded promptly.

Moreover, in the answer phone, the main control section 12 allows the display section 11 to display the total recording number of business messages and the number of recorded business messages including callers, phone numbers that have coincided with any phone numbers preliminarily recorded in accordance with the results of comparison by the comparison means.

With this arrangement, the user can easily recognize how many business messages from desired callers have been recorded promptly.

Furthermore, in the above-mentioned answer phone, business messages each of which has been recorded when the result of comparison by the main control section 12 shows that it coincides with any of the specific numbers that have been preliminarily stored have their recorded positions stored in the storage section 10, and the main control section 12, upon request for a playback of business messages, preferentially reproduces the business messages based upon the recorded positions stored in the memory section 10.

With this arrangement, upon request for a playback of business messages, the main control section 12 preferentially reproduces the messages related to the recorded positions stored in the storage section 10; thus, the user can recognize the contents of the business messages from desired callers promptly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An answer phone, which, upon receipt of an incoming call, automatically catches the communication line, records a business message sent from the caller, and upon completion of the recording of the business message, allows a display means to provide a display indicating that the business message has been recorded, the answer phone comprising:
    memory means for preliminarily storing phone numbers of specific callers;
    receiving means for receiving information from the caller sent through the communication line upon receipt of an incoming call;
    means for recording the business message from the caller in memory;
    comparison means for comparing a phone number of the caller included in caller's information that has been received by the receiving means with phone numbers that have been preliminarily stored in the memory means, said comparing being performed after said recording of the business message from the caller in memory;
    control means for carrying out a display control on the display means based upon the results of comparison by the comparison means; and
    wherein, when a ring-off signal is detected prior to a start of recording, said control means releases the communication line thereby completing an answering operation and returns to a stand-by state and no display control is effected.

2. The answer phone as defined in claim 1, wherein: when the comparison means makes a judgment that the caller's phone number coincides with any of the phone numbers preliminarily stored in the storage means, the control means allows the display means to give a special display, and thereafter, the special display is: continuously maintained independent of the results of comparison by the comparison means.

3. The answer phone of claim 2, wherein said special display given by the display means comprises a back light or an LED of the display means being caused to flicker.

4. The answer phone of claim 2, wherein said special display given by the display means comprises a back light or an LED of the display means being caused to change from a first color to a different second color.

5. The answer phone of claim 2, wherein said special display given by the display means comprises the display means displaying a message identifying a particular name associated with a phone number.

6. The answer phone as defined in claim 1, wherein the control means allows the display means to display the total recording number of business messages and the recording number of those business messages the callers' phone numbers of which have coincided with any phone numbers preliminarily stored in the storage means, based upon the comparison by the comparison means.

7. The answer phone as defined in claim 1, further comprising:
    recording-position storage means which, when the judgment by the comparison means shows that the caller's phone number coincides with any of the phone numbers preliminarily stored in the storage means, stores the recording position of the recorded business message,
    wherein, upon request for a playback of the business message, the control means preferentially reproduces the business message related to the recording position stored in the recording-position storage means.

8. The answer phone of claim 1, wherein all business messages recorded by said answer phone are recorded in a single memory so that different messages stored in said single memory correspond to different phone numbers preliminarily stored in said memory means.

9. The answer phone of claim 1, wherein, when a ring-off signal is detected prior to a start of recording but after the receiving means receives the information from the caller sent through the communication line, said control means releases the communication line thereby completing an answering operation and returns to a stand-by state and no display control is effected, and wherein said information received from the caller comprises caller ID information relating to the phone number of the caller.

10. A method of recording a message received from a caller using an answer phone which upon receipt of an incoming call from the caller automatically catches the communication line, records a message sent from the caller, and upon completion of the recording of the message, displays an indicator that the message has been recorded, the method comprising:
    storing phone numbers of specific potential callers;
    receiving an incoming call on the communication line from the caller and receiving information from the caller sent through the communication line, wherein the information received from the caller comprises information indicative of a phone number of the caller;

recording the message from the caller in memory;

after said recording of the message from the caller in memory, comparing the phone number of the caller included in the caller's information that has been received with phone numbers that have been stored;

carrying out a display control on a display based upon the results of the comparing so that a user can determine whether messages received and stored by the answer phone correspond to phone numbers stored in said storing; and when a ring-off signal is detected prior to a start of recording a message from a caller, releasing the communication line from the caller thereby completing an answering operation and returning to a stand-by state so that no display control is effected.

11. The method of claim 10, further comprising recording all messages in a single memory so that different messages stored in said single memory correspond to different phone numbers stored in said storing.

12. The method of claim 10, wherein said display control causes a back light or an LED of the display to flicker.

13. The answer phone of claim 10, wherein said display control causes a back light or an LED of the display to change from a first color to a different second color.

* * * * *